United States Patent
Camp

(10) Patent No.: US 10,096,011 B2
(45) Date of Patent: Oct. 9, 2018

(54) SMART TABLE DEVICES AND ACCESSORIES FOR DETERMINING ORDERING ASPECTS AND BILLS

(71) Applicant: EBAY INC., San Jose, CA (US)

(72) Inventor: Roy Leon Camp, Cupertino, CA (US)

(73) Assignee: eBay Inc., San Jose, CA (US)

( * ) Notice: Subject to any disclaimer, the term of this patent is extended or adjusted under 35 U.S.C. 154(b) by 142 days.

(21) Appl. No.: 14/603,320

(22) Filed: Jan. 22, 2015

(65) Prior Publication Data

US 2016/0217536 A1    Jul. 28, 2016

(51) Int. Cl.
*G06Q 20/14*    (2012.01)
*G06Q 50/12*    (2012.01)
*G06Q 20/10*    (2012.01)
*G06Q 30/06*    (2012.01)
*G01V 11/00*    (2006.01)

(52) U.S. Cl.
CPC ......... *G06Q 20/145* (2013.01); *G01V 11/002* (2013.01); *G06Q 20/102* (2013.01); *G06Q 20/14* (2013.01); *G06Q 30/0633* (2013.01); *G06Q 50/12* (2013.01)

(58) Field of Classification Search
CPC .. G06Q 50/12; G06Q 30/0633; G06Q 20/102; G06Q 20/14; G06Q 20/145; G01V 11/002
See application file for complete search history.

(56) References Cited

U.S. PATENT DOCUMENTS

| | | | | |
|---|---|---|---|---|
| 5,967,264 A | * | 10/1999 | Lutz | A47F 9/048 186/61 |
| 6,105,867 A | * | 8/2000 | Shimizu | G01G 19/4144 186/61 |
| 6,215,078 B1 | * | 4/2001 | Torres | G01G 19/4144 177/25.15 |
| 6,580,360 B1 | * | 6/2003 | McKee | G06Q 50/12 340/286.09 |
| 6,636,835 B2 | * | 10/2003 | Ragsdale-Elliott | G06Q 20/20 705/15 |
| 6,973,437 B1 | * | 12/2005 | Olewicz | G06Q 30/02 705/15 |
| 7,044,370 B2 | * | 5/2006 | Bellis, Jr. | A47F 9/047 235/383 |
| 7,257,547 B1 | * | 8/2007 | Terase | G06Q 10/087 705/15 |

(Continued)

*Primary Examiner* — Asfand M Sheikh
(74) *Attorney, Agent, or Firm* — Shook, Hardy & Bacon L.L.P.

(57) ABSTRACT

There are provided systems and method for smart table devices and accessories for determining ordering aspects and bills. A smart table may include one or more modules, devices, and/or accessory devices that determine aspects of users and items associated with the smart table, such as movements of the users, quantities of items located on the table, or other aspects. The aspects may be communicated to a merchant device to determine information about the users and items, such as if the user requires attention or if a drink is empty. Based on the information, notifications may be generated, which may be communicated to a merchant or merchant employee to provide assistance or service to the table. The information may also be utilized to generate and update historical sales statistics for the merchant, such as commonly ordered items, time until receipt of service or food, and preferred payment methods.

20 Claims, 5 Drawing Sheets

(56) References Cited

U.S. PATENT DOCUMENTS

| | | | | |
|---|---|---|---|---|
| 7,416,119 B1* | 8/2008 | Inderrieden | G01G 19/4144 | 235/378 |
| 7,487,109 B2* | 2/2009 | Taylor | G06Q 20/202 | 705/21 |
| 7,844,509 B2* | 11/2010 | Bodin | G06Q 10/087 | 340/572.1 |
| 7,945,477 B2* | 5/2011 | Werbitt | G06Q 20/20 | 340/426.19 |
| 2003/0088469 A1* | 5/2003 | Leifer | G06F 1/1626 | 705/15 |
| 2005/0108116 A1* | 5/2005 | Dobson | G06Q 40/12 | 705/30 |
| 2006/0186197 A1* | 8/2006 | Rosenberg | G06Q 30/00 | 235/380 |
| 2008/0124434 A1* | 5/2008 | Hrudka | G06Q 10/087 | 426/233 |
| 2008/0288357 A1* | 11/2008 | Stambaugh | G06Q 10/06 | 705/15 |
| 2010/0138166 A1* | 6/2010 | Do | G16H 40/63 | 702/24 |
| 2011/0187664 A1* | 8/2011 | Rinehart | G06F 3/041 | 345/173 |
| 2011/0263326 A1* | 10/2011 | Gagner | G07F 17/3211 | 463/34 |
| 2012/0166332 A1* | 6/2012 | Naaman | G06Q 20/102 | 705/40 |
| 2014/0006205 A1* | 1/2014 | Berry | G06Q 30/0641 | 705/26.7 |
| 2014/0279098 A1* | 9/2014 | Ham | G06Q 20/102 | 705/16 |
| 2015/0193844 A1* | 7/2015 | Logan | G06Q 30/06 | 705/15 |
| 2016/0092965 A1* | 3/2016 | Balar | G06Q 30/0633 | 705/15 |
| 2016/0119759 A1* | 4/2016 | Azih | H04W 4/04 | 455/456.1 |
| 2016/0189461 A1* | 6/2016 | Kanon | G06Q 20/18 | 705/51 |

* cited by examiner

SMART TABLE DEVICES AND ACCESSORIES FOR DETERMINING ORDERING ASPECTS AND BILLS

TECHNICAL FIELD

The present application generally relates to smart table devices and accessories for determining ordering aspects and bills and more specifically to utilizing tables capable of detecting aspects for users and/or items at or associated with the table to provide ordering, billing, and statistical information to merchants and users.

BACKGROUND

Users, such as diners, may visit a restaurant location in order to receive a dining experience. Restaurants may be judged based on the provided dining experience, which may include more than just the food quality, quantity, price, or other characteristic. For example, many diners choose to eat at restaurants that provide fast and/or quality service, that are attentive with their customers, or provide assistance for other various diner concerns. Furthermore, restaurants may wish to improve their customer service by providing more precise and directed service. However, without hiring additional employees, it may become difficult for the restaurant to monitor all possible tables and circumstances of their diners. Thus, some diners may be overlooked or the employees at the restaurant may be too busy to provide immediate service without prior knowledge of the pending needs of the diner. This may cause the diners themselves to request assistance and may lead to a poor dining experience. Moreover, restaurants may not be able to collect data on each table's information, such as a time until service is provided to the table, preferred payment methods, or other information that may assist the restaurant in providing better service and assistance.

Figure 1:
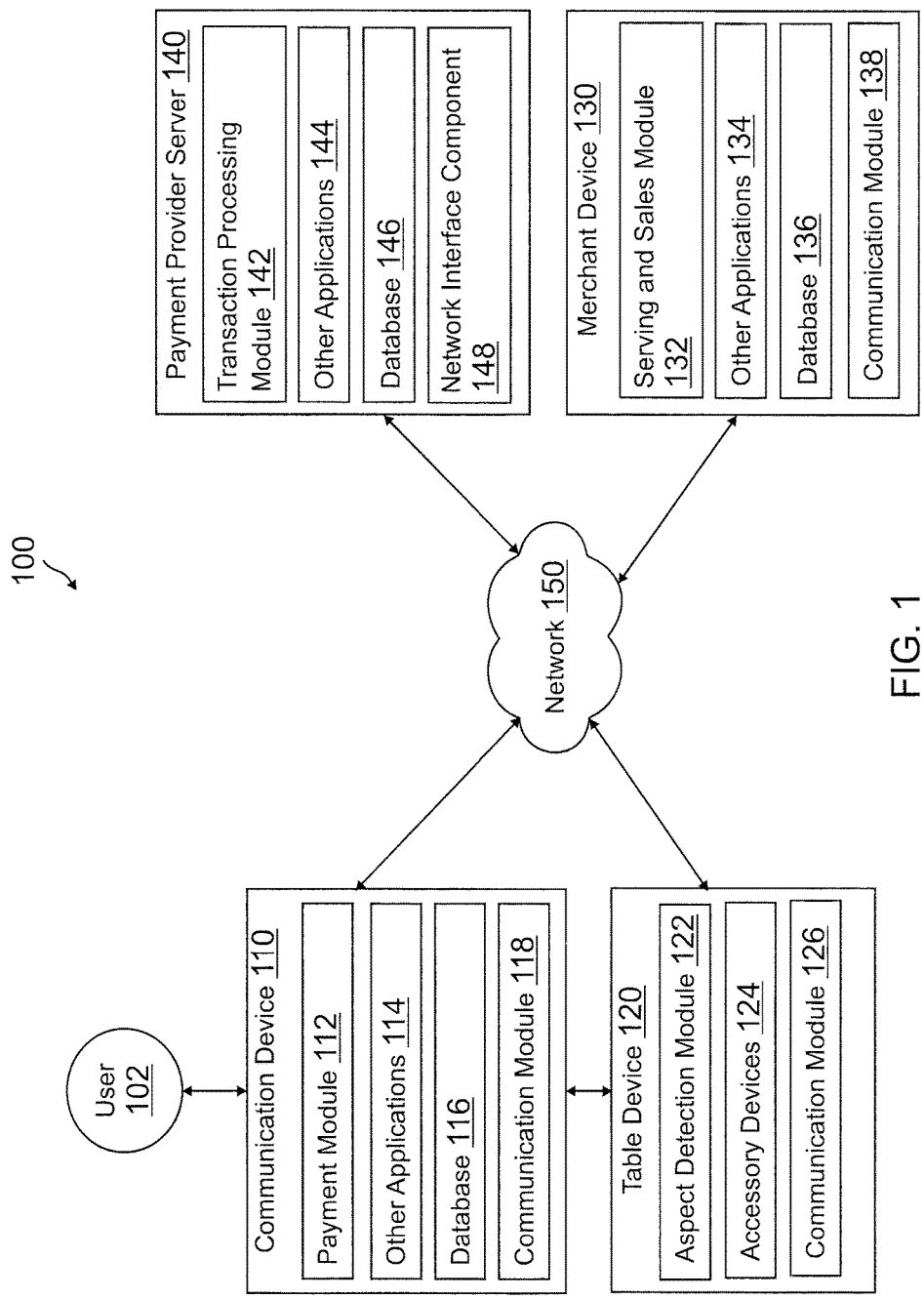
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods that provide for smart table devices and accessories for determining ordering aspects and bills. Systems suitable for practicing methods of the present disclosure are also provided.

A merchant location, such as a restaurant, may provide a table that includes a table device having one or more executable modules comprising specialized hardware and/or software and connected accessory devices to provide a "smart" table to users, such as diners or other consumers. The table device may include an aspect determination module utilized to determine one or more aspects of one or more users and/or items located at, nearby, or associated with the table. For example, the user(s) may be seated at the table so that they may be served at the table by one or more merchant employees. Furthermore, the item(s) associated with the table may include plates, bowls, or other dishware and associated food as well as drinking glasses, cups, carafes, pitchers, or other glassware and associated drinks. Thus, as aspect determined for the user(s) may correspond to a motion, status, and/or movement of the user (e.g., some action that may correspond to a state of the user), as well as a time the user has been located at the table, a time since assistance has been provided to the user, or other action by another entity associated with the user, such as a server or other merchant employee. Moreover, an aspect determined for the item(s) may correspond to a quantity, number, amount, temperature, or other characteristic of the item, as well as a number of times the item has been moved or picked up, an amount of time the item has been located at the table, and whether the user has interest in the item.

The table device may detect the user as located at the table through one or more sensors of an accessory device associated with the table, such as a weight sensor, motion sensors, or other sensor used to detect the user at the table. In other embodiments, the table device may utilize short range wireless communication with a communication device of the user to detect the user nearby the table, such as through Bluetooth, Bluetooth Low Energy, and/or LTE Direct beacon communications. The user may be notified as soon as they are in proximity to the table through their communication device. The table device may also be utilized to communicate information from the communication device to the merchant and/or a payment provider, and vice versa. For example, the user may review a bill for ordered and/or purchased food using a payment module and associated application. The user may utilize the payment application to complete the purchase by transmitting payment information for the payment request to the table device, a merchant device for the merchant, and/or a payment provider.

The table device may also determine aspects of the user while the user is located at the table using one or more accessory devices used to detect the aspect with an aspect detection module. An accessory device may correspond to a weight sensor, a touch sensor, an infrared sensor, a thermal sensor, a temperature sensor, a fluid sensor, an RFID tag, a BLE beacon, a motion sensor, a heartbeat sensor, an eye motion sensor, and a breathalyzer. In further embodiments, the accessory device may correspond to any device that may detect a parameter, characteristic, action, or other reading (e.g., an accelerometer, thermometer, barometer, etc.). As previously discussed, the aspect detected for the user may correspond to an action, movement, motion, status, or measurement of the user. For example, an aspect for the user may correspond to motions the user may make if content, agitated, bored, intoxicated, hungry, full, thirsty, etc., such as eye, hand, and/or body motions, breathing patterns, heart rate, etc.

The table device may also determine aspects related to one or more items at the table, such as glassware, dishware, and billing items, as well as food and drink items. For example, the table device may utilize the aspect detection module to determine how heavy a plate, glass or other food/drink holding item is, the temperature of the plate, glass, food, or drink, how many times a plate, glass or utensil has been lifted, an amount/quantity/number of plates, glasses, food items, or drinks available at the table, or other parameter related to the food or drink item. Thus, the table device may utilize the accessory devices to determine when a food or drink item arrives at the table, how long the food or drink item is located at the table, the temperature of the food or drink item, and/or an amount/quantity/number remaining of the food or drink item (e.g., how full a plate or glass is).

Once an aspect is determined by the table device, the aspect may be processed to determine information about the user(s) and/or item(s) at the table. In various embodiments, the processing may be performed by the table device or by a merchant device after communication of the aspect(s) from the table device to the merchant device. The information determined from aspects related to users may correspond to an amount of time the user(s) has been at the table and/or whether they require service, if the users are hungry, bored, or angry and service should be provided, whether the users are intoxicated and should be assisted or further alcohol should not be served to the users, whether the users are full or anxious and a bill should be provided. Thus, the table device and/or merchant device may determine a notification for the merchant or a merchant employee to assist the table, refrain from assisting the table, provide specific service to the table, and/or provide a bill to the table. The aspect may also correspond to a number of users at the table and/or what each individual user ordered. Thus, a split bill may also be generated as a notification and provided to the merchant, merchant employee, and/or users.

Furthermore, information for the item(s) at the table may be determined using item aspects. Information about the items may correspond to refill and/or replacement information for food and/or drink, serving information for the food/drink, ordering information for the food/drink, and/or a billing instruction or requirement for the food/drink. Thus, a notification determined using an item aspect may correspond to a generation or update of a bill for one or more items, a refill/replacement instruction for a server, a service request for the server, and/or a serving instruction for the server.

The notifications may be presented and/or communicated to the merchant and/or merchant employee through the merchant device or a device in possession of the merchant/merchant employee. Thus, the restaurant may provide assistance using the smart table and the notifications. Further, the merchant device may generate historical merchant data using the information about the users and/or items. The historical merchant data may include previous orders, bills, billing methods, time until service and/or arrival of food/drink after ordering, number or service visits and/or calls to tables, or other analytics determined using the information. The merchant device may then update the historical merchant data.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a communication device 110, a table device 120, a merchant device 130, and a payment provider server 140 in communication over a network 150. User 102, such as a consumer or a diner at a restaurant, may be seated or associated with a table corresponding to table device 120. Table device may utilize communication device 110 and/or accessory devices 124 in order to determine aspects about user 102, other users at the table corresponding to table device 120, and/or one or more items at the table corresponding to table device 120. Table device 120 may provide the aspects to merchant device 130 for processing, which may determine information for user 120, the other users at the table, and/or the item(s) at the table. Merchant device 130 may determine notifications, which may include bills for user 102 and/or the other users, which may be completed using payment provider server 140.

Communication device 110, table device 120, accessory devices 124, merchant device 130, and payment provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Communication device 110 may be implemented using any appropriate hardware and software configured for wired and/or wireless communication with table device 120, merchant device 130, and/or payment provider server 140. For example, in one embodiment, communication device 110 may be implemented as a personal computer (PC), a smart phone, laptop computer, wristwatch with appropriate computer hardware resources, eyeglasses with appropriate computer hardware (e.g. GOGGLE GLASS®) and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may be utilized.

Communication device 110 of FIG. 1 contains a payment module 112, other applications 114, a database 116, and a communication module 118. Payment module 112 and other applications 114 may correspond to processes, procedures, and/or applications, for example, a software program, executable by a hardware processor. In other embodiments, communication device 110 may include additional or different modules having specialized hardware and/or software as required.

Payment module 112 may correspond to one or more processes to execute modules and associated specialized hardware of communication device 110 to review bills (e.g., a transaction for one or more items/services ordered and/or purchased by user 102 and/or users associated with user 102 at a table corresponding to table device 120) and process and complete a payment to the merchant associated with table device 120 and merchant device 130. In this regard, payment module 112 may correspond to specialized hardware and/or software utilized to provide a convenient interface to permit user 102 to select payment options and provide payment for items and/or services ordered, consumed, and/or otherwise purchased at the table corresponding to table device 120, for example, a payment to merchant device 130 and/or a merchant account corresponding to the merchant associated with merchant device 130. In some embodiments, payment module 112 may correspond more generally to a web browser configured to view information available over the Internet or access a website corresponding to a payment service provider (e.g., payment provider server 140). In various embodiments, payment module 112 may provide for management of a user account with payment provider, such as payment provider server 140. The payment account may be utilized by payment provider server 140 during processing of payment for a payment request for a transaction with table device 120 and/or merchant device 130.

Communication device 110 may establish a connection with table device 120 using payment module 112 with communication module 118 to establish user 102 as located at or associated with a table corresponding to table device 120. Payment module 112 may be set up to receive short range wireless communications with wireless beacon 142 to complete a check-in process. For example, table device 120 may communicate with communication device 110 and connect to communication device 110 while user 102 is at or near table device 120. Table device 120 may be configured to transmit an identifier for reception by communication device 110, as will be explained in more detail herein. Payment module 112 may execute in the background of an operating system of communication device 110 and be configured to establish connections, using communication module 118 of communication device 110, with table device 120. The connection may be established with or without user input from user 102. For example, table device 120 may broadcast a token, including a universally unique identifier (UUID), for reception by payment module 112, as will be explained in more detail herein. Payment module 112 may utilize communication module 118 of communication device 110 to receive the token from table device 120. If payment module 112 acknowledges the UUID as identifying table device 120 and/or merchant device 130, payment module 112 may transmit an identifier corresponding to user 102 and/or communication device 110 back to table device 120. Payment module 112 may utilize communication module 118 of communication device 110 to communicate with table device 120 (e.g., over near field communication, Bluetooth, Bluetooth Low Energy, LTE Direct, radio, infrared, or other communication protocol). The identifier from communication device 110 may include, be transmitted with, concatenated with, or otherwise bundled with the identifier received from table device 120. Identifiers may be transmitted as an encrypted token using public/private key(s) of communication device 110, table device 120, and/or merchant device 130. Additionally, tokens may include a received identifier from the intended recipient of the token in addition to the transmitted identifier in order to identify the token's intended recipient.

Additionally, payment module 112 may receive payment requests and/or other transaction information, as discussed herein, such as a bill for items (e.g., products, goods, services, etc., herein referred to as an "item" or "items") ordered, received, and/or consumed by user 102. Thus, payment module 112 may populate the bill. For example, payment module 112 may be used to generate a bill from displayable items and request those items, or may include the bill received from wireless beacon 142. Payment module 112 may be utilized to facilitate creation of a payment token for table device 120. Thus, payment module 112 may be used, for example, to provide a convenient interface to permit user 102 to select payment options for payment instruments and provide payment for items and/or services. Such payment instruments may include a payment account as well as credit/debit/gift cards and/or bank accounts. For example, payment module 112 may be implemented as an application having a user interface enabling the user to enter payment options for storage by communication device 110, provide payment to merchant device 130, and complete a transaction for the items using the aforementioned payment instrument. In certain embodiments, payment module 112 may correspond more generally to a web browser configured to view information available over the Internet or access a website corresponding to a payment provider. Thus, after acceptance of all or part of the transaction/items available in the transaction, user 102 may complete payment for the transaction using payment module 112.

Payment module 112 may be utilized to facilitate creation of a payment token for merchant device 130. The payment token may be generated using payment information (e.g. a payment instrument, such as a user account or payment card information) from payment module 112 and the payment token may be transmitted by payment module 112 to table device 120 and/or merchant device 130. Payment provider server 150 may provide payment for the transaction to the merchant/merchant device 130 or merchant device 130 may process the payment account in the payment token to receive payment for the transaction.

Communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. Other applications 114 may contain software programs, executable by a processor, including a graphical user interface (GUI) configured to provide an interface to the user.

Communication device 110 may further include database 116 which may include, for example, identifiers such as operating system registry entries, cookies associated with payment module 112 and/or other applications 114, identifiers associated with hardware of communication device 110, or other appropriate identifiers, such as identifiers used for payment/user/device authentication or identification. Database 116 may include communication device tokens and/or encryption keys, including a public key of table device 120, merchant device 130, and/or payment provider server 140, as well as private keys for communication device 110. Database 116 may include identifying information for tokens enabling connection module 112 to identify table device 120 and/or merchant device 130 when receiving a corresponding connection/check-in token. In one embodiment, identifiers in database 116 may be used by a payment/credit provider, such as payment provider server 140, to associate communication device 110 with a particular account maintained by the payment/credit provider. Database 116 may further include payment card information, including credit, debit, and/or gift card information. In various embodiments, database 116 may include information to access an online account, including a payment account with payment provider server 140.

Communication device 110 includes at least one communication module 118 adapted to communicate with table device 120, wireless beacon 142, payment provider server 140, and/or payment card issuer server 160. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with wireless beacon 142 without network 150 using short range communications, such as Bluetooth Low Energy, LTE Direct, radio frequency, infrared, Bluetooth, and near field communications.

Table device 120 may be located at a physical retail location, such as a restaurant, vendor stand, or other location where user 102 may visit to purchase food and/or drinks. Additionally, the retail location may include other features not pictured in FIG. 1, such as wireless beacons for communicating with communication device 110 and establishing an initial connection between communication device 110 and table device 120/merchant device 130, network connection devices to network 150, and other merchants and services.

Table device 120 may be maintained, for example, by a merchant or seller offering various items, products, and/or services through a merchant location. Generally, table device 120 may be maintained by anyone or any entity that receives money, which includes retailers and restaurants. In other embodiments, table device 120 may be maintained by an entity offering services to user 102, such as dining services or the like. In this regard, table device 120 may include a device having processing applications, which may be configured to interact with communication device 110, merchant device 130, and/or payment provider server 140 to facilitate the sale of items.

Table device 120 may be implemented using any appropriate hardware and software configured for wired and/or wireless communication with communication device 110, merchant device 130, and/or payment provider server 140. For example, in one embodiment, table device 120 may be implemented as a single or networked personal computer (PC), a smart phone, personal digital assistant (PDA), laptop computer, and/or other types of computing devices at a merchant location capable of transmitting and/or receiving data. Although only one table device is shown, a plurality of table devices may function similarly at the merchant location. Additionally, in some embodiments, one or more of the below described modules, processes, and/or functions may instead be performed by merchant device 130 and vice versa.

Table device 120 of FIG. 1 contains an aspect detection module 122, accessory devices 124, and a communication module 126. Aspect detection module 122 may correspond to processes, procedures, and/or applications, for example, a software program, executable by a hardware processor. In other embodiments, table device 120 may include additional or different modules having specialized hardware and/or software as required.

Aspect detection module 122 may correspond to one or more processes to execute modules and associated specialized hardware of table device 120 to detect and determine one or more aspects of user 102, another user at a table associated with table device 120, and/or items at the table, for example, using accessory devices 124 and/or communication module 126 and communicate the aspects to merchant device 130 for processing. In this regard, aspect detection module 122 may correspond to specialized hardware and/or software utilized to utilize accessory devices 124 and/or communication module 126 to detect location, measurements, or other parameters of user 102, other users at the table associated with table device 120, and/or the items at the table. Thus, aspect detection module may utilize sensors, device connections, and/or other detectors to determine an aspect. For example, aspect detection module 122 may determine an aspect of a user (e.g., user 102 and/or another user at the table associated with table device 120) by detecting the user arriving at the table and how long the user has been seated at the table (e.g., an arrival time and/or waiting time) using a connection between communication device 110 and communication module 126. In other embodiments, the arrival and waiting time may be determined using a weight sensor of accessory devices 124 in a chair, floor, or other location near the table. Aspect detection module 122 may also detect motions, statuses, and/or movements of the user through accessory devices 124, such as eye, face, hand, leg, and/or other body motions, body temperature, perspiration, intoxication, heartbeat, or other body measurements. Such motions, statuses, and/or movements may be detected through weight and/or motion sensors, microphones, cameras, breathalyzers, or other sensor capable of detecting the aforementioned measurements.

Aspect detection module 122 may also determine aspects for items on and/or associated with the table corresponding to table device 120. Aspects related to one or more items may correspond to weight, temperature, number, quantity, amount, time when served, time when consumed, movement, location, or other detectable aspect. Similarly, aspect detection module 122 may utilize accessory devices 124 to detect measurements, movements, and/or locations for the item(s). The aspect(s) for the item(s) may correspond to how much remains of the item(s), the temperature of the item(s), how long the item(s) has been located at the table, or other item information. Aspect detection module 122 may utilize accessory device 124 to take measurements (e.g., through weight sensors, cameras, thermometers, or other sensor capable of detecting the aforementioned measurements). Once a measurement is detected, aspect detection module 122 may determine the associated aspect. Thus, accessory devices 124 may determine the aspects, which may be communicated to merchant device 130 to determine information using the aspects, as explained herein.

As discussed herein, aspect detection module 122 may detect an aspect of a user (e.g., user 102 or another user at the table corresponding to table device 120) using communication module 126, for example, by connecting with communication device 110 or another device on the person of the user at the table. Thus, aspect detection module 122 may include processes for transmitting requests to establish a connection between a communication device and table device 120. Table device 120 may utilize a short range wireless communication to transmit requests to establish a connection with communication device 110, including an identifier such as a Universal Unique Identifier (UUID). If communication device 110 receives the request to establish the connection and responds with a communication device identifier (potentially including the UUID and other information to effectuate a check-in of communication device 110), table device 120 may ramp up in power and create a connection between communication device 110 and table device 120.

Table device 120 may transmit the request to establish the connection with table device 120 as a short range communication (e.g. a BLE protocol communication) including a "wake up" process for communication device 110 and/or a token for table device 120 and/or merchant device 130. In other embodiments, the request and/or connection may utilize near field communication, radio communication, infrared communication, or Bluetooth communication. Additionally, although table device 120 may utilize BLE protocol communications to effectuate an "always on" type service where the UUID and "wake up" process are transmitted continuously by table device 120, other communication protocols used to provide an "always on" service may include QUALCOMM® LTE Direct or similar device-to-device communication technology. BLE and LTE Direct may both be utilized to provide discovery of nearby devices to table device 120 and establishment of a connection.

The request may be specific to communication device 110 by including information that is specific to user 102, such as a name, identifier, or communication device identifier. The information specific to user 102 may be determined from a user account of user 102 or other information previously provided to table device 120 and/or merchant device 130 (or a server corresponding to table device 120 and/or merchant device 130). Thus, in certain embodiments, only communication device 110 will pick up and authenticate the request. After table device 120 receives a communication device identifier from communication device 110, table device 120 may determine user 102 is in proximity to table device 120. If check-in with table device 120 has not previously been completed, then table device 120 may complete check in. Table device 120 may pass the identifier to table device 120 to connect with communication device 110.

Additionally, table device 120 may keep a communication channel open between communication device 110, table device 120, merchant device 130, and/or payment provider server 140 for passing additionally information, such as item, transaction, payment, or identification information. For example, table device 120 may communicate over BLE with communication device 110. Once communication device 110 transmits a payment token corresponding to payment information for a payment request, table device 120 may receive the token for transmission to merchant device 130. In other embodiments, communication device 110 may communicate the payment token to merchant device 130 directly for processing.

Accessory devices 124 may be maintained, for example, by a merchant or seller corresponding to table device 120 and merchant device 130, such as a restaurant. Generally, accessory devices 124 may be maintained by anyone or any entity that receives money, which includes retailers and restaurants. Accessory devices 124 may be implemented using any appropriate hardware and software configured for wired and/or wireless communication with table device 120. For example, in one embodiment, accessory devices 124 may be implemented as a sensor and associated hardware to communicate detected measurements, movements, actions, statuses, motions, or other detectable information. Accessory devices 124 may be utilized to detect the aforementioned information for one or more users and/or items at the table corresponding to table device 120. Thus, accessory devices 124 may include such sensors as a weight sensor, a touch sensor, an infrared sensor, a thermal sensor, a temperature sensor, a fluid sensor, an RFID tag, a BLE beacon, a motion sensor, a heartbeat sensor, an eye motion sensor, and a breathalyzer. Although accessory devices 124 are discussed in plurality, a single accessory device may be utilized.

Merchant device 130 may be maintained, for example, by a merchant, which may offer one or more items and/or services for purchase through a merchant location, such as a restaurant. In this regard, merchant device 130 includes one or more processing applications which may be configured to interact with communication device 110, table device 120, and/or payment provider server 140 to facilitate purchase and sale of items and generation of a transaction for the items and payment for the transaction using a payment request having a payment instrument for user 102. Merchant device 130 may further provide processing of aspects determined by table device 120 for use in providing service to user 102 and/or another user at the table corresponding to table device 120. In such embodiments, merchant device 130 may be implemented as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although only a single merchant device is shown, a plurality of merchant devices may function similarly. Although merchant device 130 is discussed as a device local to a merchant location (e.g., a restaurant), a server at or remote from the merchant location may also be utilized. Additionally, in some embodiments, one or more of the below described modules, processes, and/or functions may instead be performed by table device 120 and vice versa.

Merchant device 130 of FIG. 1 contains a serving and sales module 132, other applications 134, a database 136, and a communication module 138. Serving and sales module 132 and other applications 134 may correspond to processes, procedures, and/or applications, for example, a software program, executable by a hardware processor. In other embodiments, merchant device 130 may include additional or different modules having specialized hardware and/or software as required.

Serving and sales module 132 may correspond to one or more processes to execute modules and associated specialized hardware of communication device 110 to provide a merchant sales interface permitting a merchant or merchant employee to generate a bill (e.g., a transaction having a purchase price for ordered and/or consumed items) for one or more items selected by user 102 and/or other users at a table for user 102 (e.g., the table corresponding to table device 120) for purchase and process a purchase request for the bill. In this regard, serving and sales module 132 may correspond to specialized hardware and/or software to access and/or receive item information for use in generating a bill with the merchant associated with table device 120 and merchant device 130. For example, in certain embodiments, serving and sales module 132 may receive input for the item, such as entry of an item number, lookup of the item in a menu interface, scan of a barcode, etc. After selecting items for purchase, payment module 112 and/or serving and sales module 132 may generate a bill for the selected item(s), as discussed herein, for example, by gathering the item(s)/ service(s) into a bill and providing a checkout interface for completion of the transaction. The bill may be generated from items served to, consumed by, and/or ordered by user 102 and/or other users at the table corresponding to table device 120. The checkout interface may include an option for user 102 to provide payment for the bill, for example, using payment module 112 by submitting a purchase request to serving and sales module 132 (e.g., through a payment account or payment card in a payment token, where payment module 112 has information necessary to provide payment through the payment instrument). In other embodiments, user 102 may provide the payment instrument to merchant device 130 (e.g., a physical payment card or entry of a login to a payment account), where serving and sales module 132 generates the purchase request for the bill with the submitted payment instrument. In various embodiments, the bill may be split by one or more users at the table. Thus, serving and sales module 132 may receive entry of separate payment instruments and/or payment tokens. In such embodiments, serving and sales module 132 may split the bill based on input from the merchant or merchant employee, or may utilize detected aspects to divide the bill, as discussed herein.

Serving and sales module 132 may also provide processing of received aspects from table device 120. As discussed herein, an aspect may correspond to a trait, measurement, action, movement, status, location, motion, or other detectable information about a user and/or an item. An aspect for an item may correspond to more than one of aforementioned detectable information parameters, as well as multiples of the same parameters. For example, an aspect may correspond to a temperature of a drink, or may correspond to a number of times a drink has been picked up from the table. An aspect may also correspond to a movement and location of a user, such as if the user is getting up and leaving the table. Once received, the aspects may be processed to determine information based on the aspect. Serving and sales module 132 may determine how much is remaining of an item using the aspects. For example, if a drink or food item is picked up or moved around repeatedly, serving and sales module 132 may determine that not much if any of the item remains, and service may be required to refill, or at least check on, the item. Weight may also be utilized to determine how much remains of a food item, as well as where the container for the food item is placed (e.g., in front of a user or off, signifying current attention and consumption, or to the side of the user, signifying the user is done with the item).

Similarly, the aspects may be processed to determine an adequate serving temperature of the item. For example, if the temperature of a hot food item cools to below adequate temperature or a temperature of a cold drink rises above an acceptable temperature, the item may no longer be of appropriate or required temperature. Further aspects may be utilized to determine additional information about the item, such as how long the item has been at a table (e.g., through weight sensors, an RFID tag on a plate/glass, etc.), when the item arrived at the table, and/or if the users at the table require assistance with the item (e.g., the item has not been removed and/or the food touched, such as through weight and/or location sensors). Serving and sales module 132 may also determine which users have ordered and/or consumed each food/drink item and how much of each food/drink item based on a weight of a container for the food/drink and/or a weight of a serving dish/glass associated with the user (e.g., in front of the user) as well as locations of the food/drink or a serving dish/glass for the food/drink (e.g., in front of the user). Thus, using detection of a location of the user by table device 120, serving and sales module 132 may attribute an item and/or a quantity, amount, or number of the item to the individual user. Serving and sales module 132 may thereby divide a bill based on each user's individual consumption.

Serving and sales module 132 may also determine information about user 102 and/or other users at the table corresponding to table device 120. As discussed herein, aspects about users may also correspond to a trait, measurement, action, movement, status, location, motion, or other detectable information, and/or any combination of the aforementioned detectable information parameters. Thus, serving and sales module 132 may determine when a user arrives at a table, how long the user has been located at the table, and/or when a server or other merchant/merchant employee has served the user using location detection of the user and/or the server (e.g., through a connection between communication device 110 and/or another device and table device 120, through weight, motion, temperature, or other sensor, etc.). Serving and sales module 132 may also attribute each user with a location at the table using location detection and detection of the user's parameters, such as weight, shoe size/type, etc. Serving and sales module 132 may also determine other information about the user(s), such as whether the user is impatient, satisfied, angry, upset, happy, tired, or other status, using detection of body parameters, such as eye, head, body, hand/arm, leg, etc. motion, heart rate detection, perspiration, eye readings, noise detection and/or determination of speech information (e.g., whether language used by the user indicated one of the aforementioned statuses), or other detectable information parameter. Serving and sales module 132 may also determine further information about users, such as intoxication levels through body movements and/or a breathalyzer.

Once information about the user and/or item is detected, serving and sales module 132 may further determine and generate notifications or other alerts and communications to provide a merchant and/or merchant employee associated with table device 120 and merchant device 130. A notification may be an instruction to serve or provide service to a table, for example, if a refill, replacement, and/or refreshment of an item is determined based on the item's information (e.g., quantity, number, amount, temperature, etc.). The notification may also include a serving instruction, such as an instruction to pour drinks or assist in serving food. The notification may also correspond to an alert of when the user has last been served or when the user arrived, as well as how long the user has been waiting and/or how long until food/drink was served or has been at the table. The notification may further correspond to alerts to stop service or provide different service, such as if a user is overly intoxicated or if the user has finished a meal and requires only a check. The notification may also correspond to a bill, and may be split on detection of each users' location and the food/drink consumed for the user at the location, as discussed herein.

Serving and sales module 132 may further determine and update historical sales and service statistics for the merchant corresponding to table device 120 and merchant device 130, as well as individual merchant employees, such as the merchant employee serving the table associated with table device 120. Such statistics may be determined and updated based on the information determined from the aspects, as well as generated notifications. Statistics may include a time until a table is first served from arrival of one or more users, an amount of time until food/drink arrives at the table after arrival and/or ordering, types of food/drink commonly ordered and/or uncommonly or not ordered, a number of times a table is visited for service, an amount spent at the table (e.g., per user and/or per table), and/or preferred billing methods. Other statistics may also be tracked and recorded.

In various embodiments, merchant device 130 includes other applications 134 as may be desired in particular embodiments to provide features to merchant device 130. For example, other applications 134 may include security applications for implementing client-side security features, programmatic client applications for interfacing with appropriate application programming interfaces (APIs) over network 150, or other types of applications. Other applications 134 may contain software programs, executable by a processor, including a graphical user interface (GUI), configured to provide an interface to a user of merchant device 130 (e.g., a merchant or merchant employee). In various embodiments where not provided by serving and sales module 132, merchant device 130 may include communication applications, such as messaging, phone, email, or other applications for use in contacting user 102 and/or the merchant or merchant employee (e.g., through a device on the person of the merchant or merchant employee).

Additionally, merchant device 130 includes database 136. Database 136 may include item information used by payment module 112 and/or serving and sales module 132 to generate a bill or other transaction, such as item information, pricing, merchant application interface components, and/or merchant information. Database 136 may further include purchase requests for the bill, which may be processed by merchant device 130 and/or communicated to payment provider server 140 for receipt of a payment. Database 136 may also store received aspects for users and/or items, information determined from the aspects, and notifications for communication to a merchant and/or merchant employee. Additionally, historical sales and/or serving information may be stored to database 136.

In various embodiments, merchant device 130 includes at least one communication module 138 adapted to communicate communication device 110, table device 120, and/or payment provider server 140 over network 150. In various embodiments, communication module 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Payment provider server 140 may be maintained, for example, by an online payment service provider, which may provide payment services and/or processing for financial transactions on behalf of a user with a merchant. In this regard, payment provider server 140 includes one or more processing applications which may be configured to interact with communication device 110, table device 120, and/or merchant device 130 to facilitate payment for a transaction. In one example, payment provider server 140 may be provided by PAYPAL®, Inc. of San Jose, Calif., USA. However, in other embodiments, payment provider server 140 may be maintained by or include a credit provider, financial services provider, financial data provider, and/or other service provider, which may provide payment services to user 102.

Payment provider server 140 of FIG. 1 includes a transaction processing module 142, other applications 144, database 146, and a network interface component 148. Transaction processing module 142 and other applications 144 may correspond to processes, procedures, and/or applications, for example, a software program, executable by a hardware processor. In other embodiments, payment provider server 140 may include additional or different modules having specialized hardware and/or software as required.

Transaction processing module 142 may correspond to one or more processes to execute modules and associated specialized hardware of transaction processing module 142 to receive and/or transmit information from communication device 110 and/or merchant device 130 for processing and completion of financial transactions. In this regard, transaction processing module 142 may correspond to specialized hardware and/or software utilized by payment provider server 140 to process financial transaction information from communication device 110 and/or merchant device 130 by receiving a payment token having a payment instrument and/or a bill or a purchase request for the bill. Thus, the payment token may correspond to a payment request for the bill between user 102 and the merchant corresponding to merchant device 130. The payment token may include information corresponding to user identifiers, user financial information/identifiers, transaction information and/or other identifiers. Additionally, the payment token may include a payment amount and terms of payment for the bill. Once received, transaction processing module 142 may utilize a payment account or financial information (e.g., a payment instrument such as a credit/debit card, bank account, etc.) of user 102 to render payment for the transaction. Payment may be made to merchant device 130 and/or a merchant server or merchant account using the payment instrument and the terms of the payment request. Additionally, transaction processing module 142 may provide transaction histories, including receipts, to communication device 110, merchant device 130, and/or another device (e.g., a device of a merchant employee serving the table corresponding to table device 120) for completion and documentation of the financial transaction.

In various embodiments, payment provider server 140 includes other applications 144 as may be desired in particular embodiments to provide features to payment provider server 140. For example, other applications 144 may include security applications for implementing server-side security features, programmatic server applications for interfacing with appropriate application programming interfaces (APIs) over network 150, or other types of applications. Other applications 144 may contain software programs, executable by a processor, including a graphical user interface (GUI), configured to provide an interface to a user.

Additionally, payment provider server 140 may include database 146. As discussed herein, user 102 may establish one or more user accounts with payment provider server 140. Database 146 may include user information, such as name, address, birthdate, payment/funding information, additional user financial information, and/or other desired user data. User 102 may link database 146 to communication device 110 through a communication device identifier. Thus, when a device identifier corresponding to communication device 110 is transmitted to payment provider server 140, e.g. from communication device 110 and/or merchant device 130, a user account belonging to user 102 may be found. However, in other embodiments, user 102 may not have previously established a user account. Thus, payment provider server 140 may complete a transaction based on another user financial account, payment card, bank account, or other payment instrument received from communication device 110 and/or merchant device 130.

In various embodiments, payment provider server 140 includes at least one network interface component 148 adapted to communicate with network 150 including communication device 110 and/or merchant device 130. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
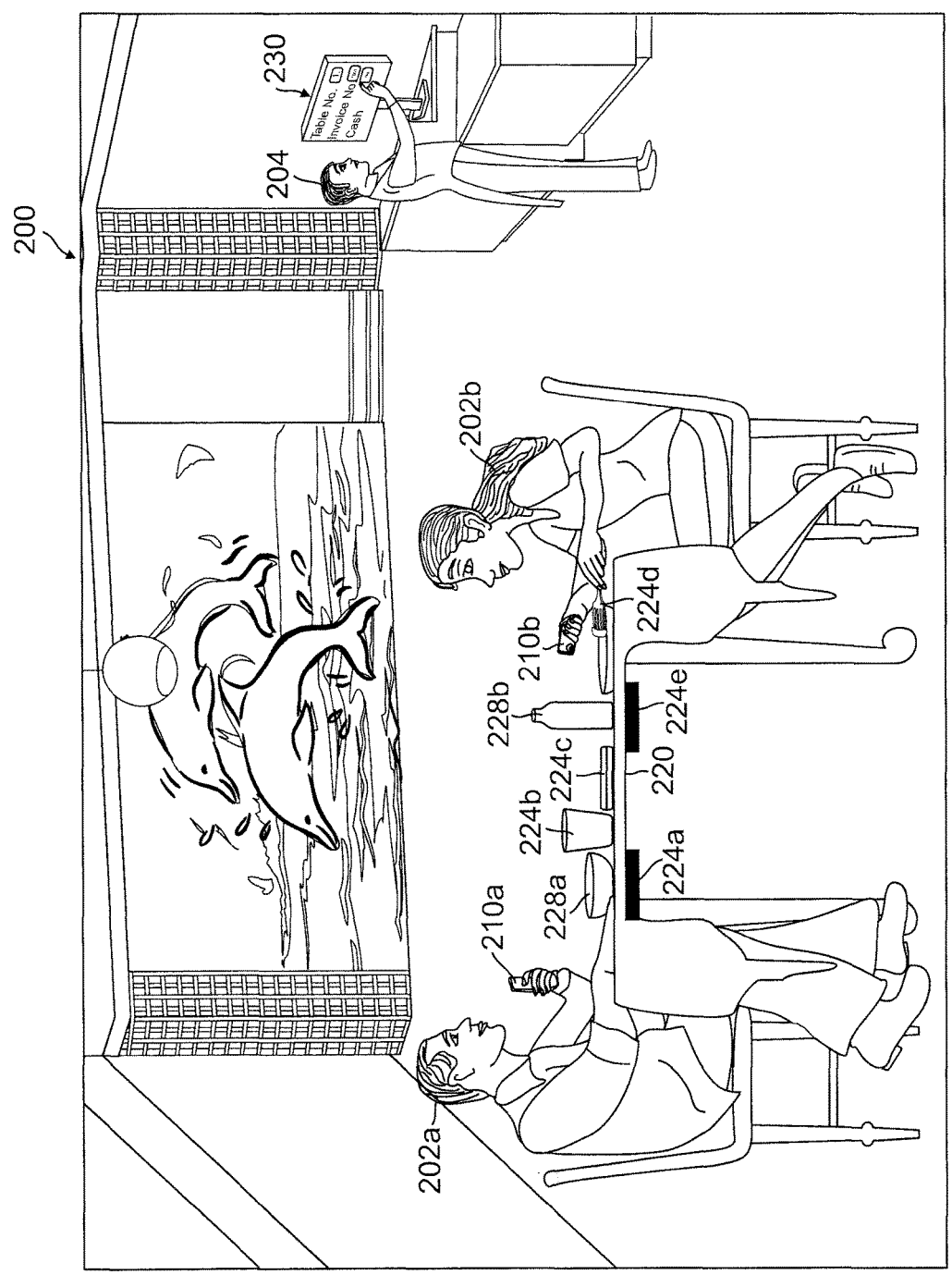
FIG. 2 is an exemplary merchant environment having a smart table including one or more modules, devices, and/or accessories for detecting and determining aspects of users and/or items associated with the smart table, according to an embodiment.

FIG. 2 is an exemplary merchant environment having a smart table including one or more modules, devices, and/or accessories for detecting and determining aspects of users and/or items associated with the smart table, according to an embodiment. Environment 200 of FIG. 2 includes a user 202a having a communication device 210 and a user 202b having a communication device 210b corresponding generally to user 102 having communication device 110, respectively, of FIG. 1. Environment 200 further includes a table device 220 and a merchant device 230 corresponding generally to table device 120 and merchant device 130, respectively, of FIG. 1. Additionally, environment 200 includes an accessory device 224a, an accessory device 224b, and accessory device 224c, an accessory device 224d, and an accessory device 224e all corresponding generally to accessory devices 124 of FIG. 1.

Environment 200 in FIG. 2 may correspond to a merchant location where user 202 may visit to receive service for one or more items, such as a restaurant or similar location. Thus, in environment 200, user 202a and user 202b visit environment 200 in order to order food and/or drinks while seated at a table. Users 202a and 202b are also served by a merchant employee 204 while seated at the table. As shown in environment 200, users 202a and 202b have ordered at the table and have various food and drink items in front of users 202a and 202b. In order to assist in service to users 202a and 202b, table device 120 may determine aspects of users 202a and/or 202b as well as the items on the table and communicate the aspects to merchant device 230 for processing.

Thus, table device 220 may determine that user 202a and user 202b are at the table corresponding to table device 220 using a connection between table device 220 and one or more of communication devices 210a and/or 210b. As discussed herein, table device 220 may utilize short range wireless communications between table device 220 and communication devices 210a and/or 210b to detect that users 202a and/or 202b have arrived at the table. Moreover, based on the connection, triangulation of a position, and/or other location based detection process, table device 210 may associate user 202a and/or user 202b with a certain spot or location at the table. For example, table device 220 may utilize a first connection with communication device 210a through a first communication module, device, or beacon situated near the left side of the table to detect that user 202a is located on the left side of the table. Similarly, user 202b may be determined to be located at the right side of the table. The aspects corresponding to detection of users 202a and/or 202b, a time of arrive (e.g., time of establishment of the connection) for users 202a and/or 202b, and/or the locations of users 202a and/or 202b may be communicated to merchant device 230 for processing and determination of notifications for merchant employee 204 (e.g., a notice to serve the table, information to split a bill for the table, etc.).

Additionally, table device 120 may utilize accessory devices 224a-e to detect measurements, statuses, amounts, numbers, quantities, movements, motions, and/or other parameter information for users 202a, 202b, and/or items at the table corresponding to table device 120. In this regard, table device 220 may receive data from accessory devices 224a-e. For example, accessory device 224a is shown as being located below a bowl 228a. Accessory device 224a may correspond to a weight sensor that may detect a weight, location, or other information about bowl 228a (e.g., a number of times bowl 228a is picked up or moved). Accessory device 224b may correspond to a glass that may include an RFID tag, temperature sensor, and/or humidity sensor, and may be configured to detect aspects related to a drink, such as a temperature, quantity, etc. Accessory device 224c may correspond to a bill folder, display device, or other object that may provide a bill to users 202a and 202b. Accessory device 224c may include a sensor that may detect if payment has been placed with accessory device 224c (e.g., a sensor to detect opening or movement of a bill folder, placement of a payment instrument with accessory device 224c, etc.). Accessory device 224d may correspond to a utensil, which may include an accelerometer or other device that detects movement and whether user 202b is still eating. Moreover, accessory device 224e may also correspond to a weight sensor, which may detect aspects of a drinking glass 228b, such as weight and/or number of times drinking glass 228b has been picked up and consumed. The aforementioned aspects may be then communicated to merchant device 230 to determine notifications for merchant employee 204. Thus, merchant employee 204 may be alerted of service notifications, such as a notification for a replacement/refill, service requirement or instruction, or other notification associated with service provided to users 202a and 202b.

Figure 3:
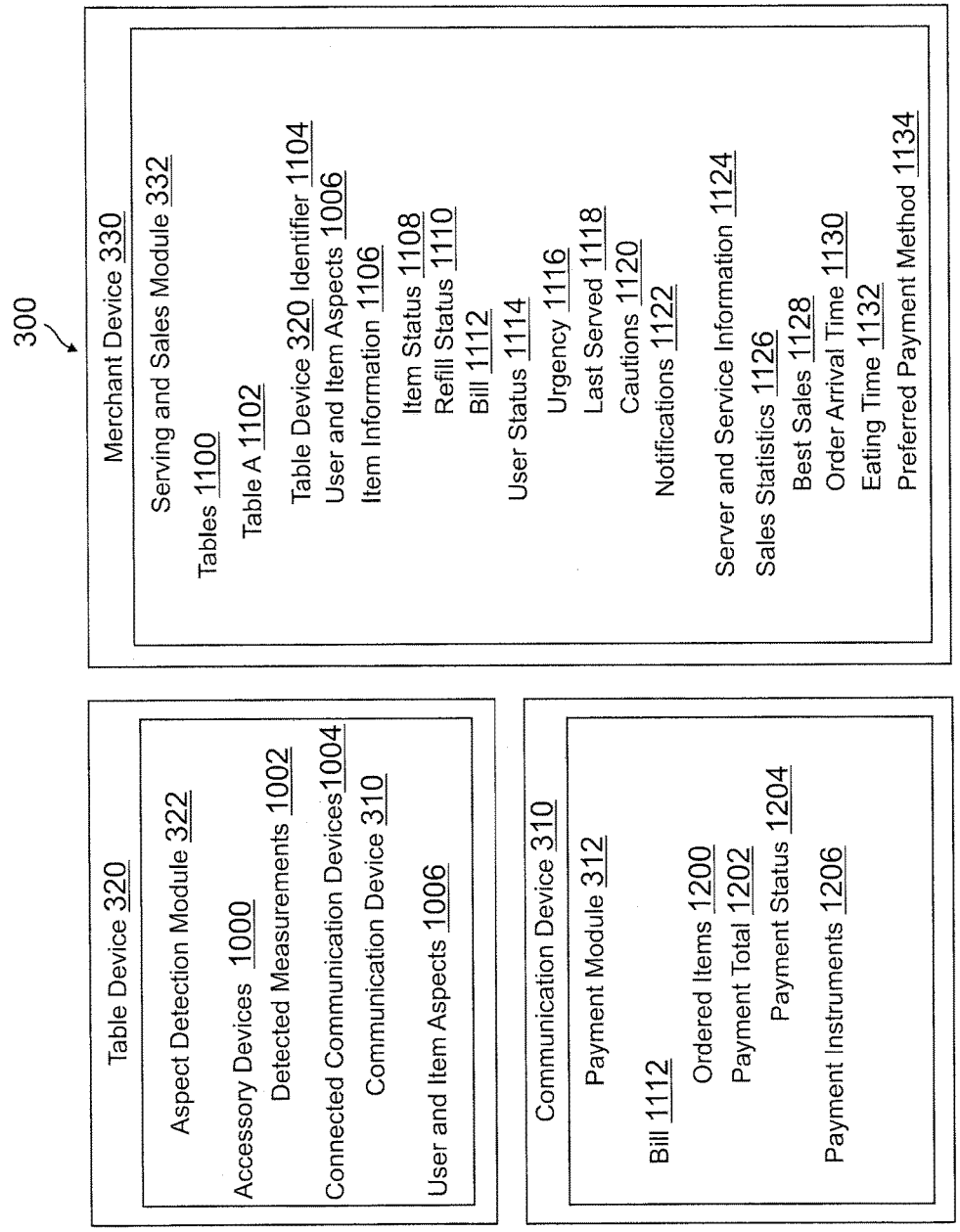
FIG. 3 is a system environment having a table device of a smart table determining aspects of users and/or items at the smart table and communicating the aspects to a merchant device for processing, according to an embodiment.

FIG. 3 is a system environment having a table device of a smart table determining aspects of users and/or items at the smart table and communicating the aspects to a merchant device for processing, according to an embodiment. Environment 300 includes a communication device 310, a table device 320, and a merchant device 330 corresponding generally to communication device 110, table device 120, and merchant device 130, respectively, of FIG. 1.

Table device 320 executes an aspect detection module 322 corresponding generally to the specialized hardware and/or software modules and processes described in reference to aspect detection module 122 of FIG. 1. In this regard, aspect detection module 322 determines aspects for users and/or items at or associated with a table corresponding to table device 320. Thus, aspect detection module 322 may receive information from accessory devices 1000, such as detected measurements 1002. In other embodiments, aspect detection module 322 may receive further information from accessory devices 1000, such as actions, motions, statuses, etc. Aspect detection module 322 may also receive aspects related to nearby users at the table, such as through connected communication devices 1004 having communication device 310. Using the aforementioned information, aspect detection module 322 may determine user and item aspects 1006.

Merchant device 330 executes a serving and sales module 332 corresponding generally to the specialized hardware and/or software modules and processes described in reference to serving and sales module 132 of FIG. 1. In this regard, serving and sales module 322 processes aspects received from table device 320 to determine information for one or more tables and notifications for a merchant or merchant employee for the table corresponding to the aspect(s). Thus, serving and sales module 332 includes tables 1100 having at least table A 1102. Table A 1102 includes table device 320 identifier 1104 for use in identification of table device 320. Table A 1102 includes further information, such as user and item aspects 1006 received from table device 320.

Using user and item aspects 1006, serving and sales module 332 may determine item information 1106, such as an item status 1108 (e.g., completed, hot/warm/cold, etc.), refill status 1110, and a bill 1112 having consumed and/or ordered items. Serving and sales module 332 may further determine user status 1114 including, for example, urgency 1116 (e.g., when the user arrived and/or if the user requires immediate service), last served 1118 (e.g., having a last time a server visited the table corresponding to table device 320), and cautions 1120 (e.g., if one or more users at the table are overly intoxicated, require assistance including aid or handicap assistance, etc.). Serving and sales module 322 may further include server and service information 1124, which may be utilized to generate notifications to servers based on available servers and/or services. Additionally, serving and sales module 332 may generate historical serving and sales information, such as sales statistics 1126 having best sales 1128, order arrival time 1130, eating time 1132, and preferred payment method 1134.

Communication device 310 executes a payment module 312 corresponding generally to the specialized hardware and/or software modules and processes described in reference to payment module 312 of FIG. 1. In this regard, payment module 312 may receive a bill and generate a purchase request having a payment instrument for the bill. Thus, payment module 312 includes a bill 1112 from merchant device 332. Bill 1112 in payment module 312 includes ordered items 1200 and payment total 1202 having payment status 1204. Payment module 312 further includes payment instruments 1206 for use in completing payment for bill 1112, such as through a payment token having the purchase request.

Figure 4:
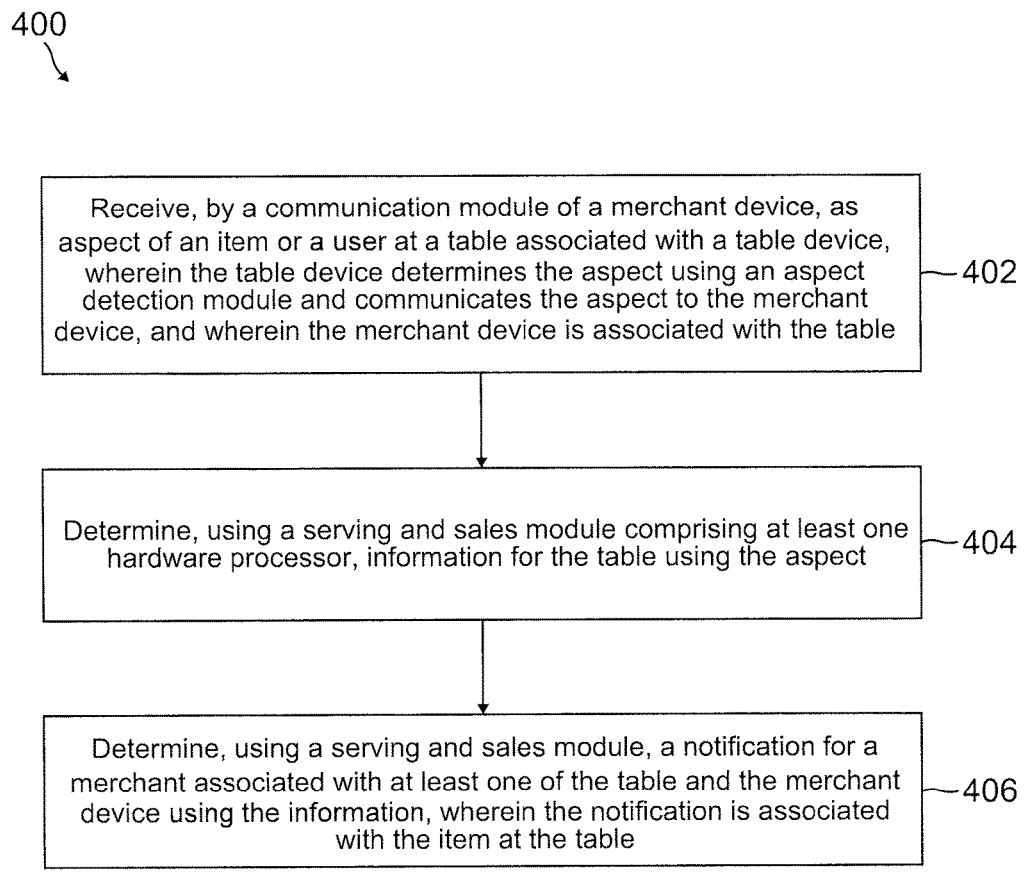
FIG. 4 is a flowchart of an exemplary process for smart table devices and accessories for determining ordering aspects and bills, according to an embodiment.

FIG. 4 is a flowchart of an exemplary process for smart table devices and accessories for determining ordering aspects and bills, according to an embodiment. Note that one or more steps, processes, and methods described herein may be omitted, performed in a different sequence, or combined as desired or appropriate.

At step 402, an aspect of an item or a user at a table associated with a table device is received, by a communication module of a merchant device, wherein the table device determines the aspect using an aspect detection module and communicates the aspect to the merchant device, and wherein the merchant device is associated with the table. A second communication module of the table device may connect with a communication of the user located at the table. The communication device and the second communication module may connect using one of near field communication, radio communication, infrared communication, Bluetooth communication, Bluetooth Low Energy (BLE) communication, LTE Direct communication, and WiFi communication.

The at least one accessory device may comprise at least one of a weight sensor, a touch sensor, an infrared sensor, a thermal sensor, a temperature sensor, a fluid sensor, an RFID tag, a BLE beacon, a motion sensor, a heartbeat sensor, an eye motion sensor, and a breathalyzer. Thus, the at least one accessory device may detect a first measurement of the at least one item at the table, and wherein the aspect detection module determines the first aspect using the first measurement. The first measurement may comprise at least one of a quantity of the at least one item left at the table, a temperature of the at least one item, a number of times the at least one first item has been picked up or placed on the table, and an amount of time the at least one item is at the table. The at least one accessory device may also detect at least one of a motion, a status, and a measurement of the user, and wherein the aspect detection module determines the first aspect using the at least one of the motion, the status, and the measurement of the user.

At step 404, information for the table is determined using the aspect, using a serving and sales module comprising at least one hardware processor. The first information may comprise at least one of a refill amount of the at least one item, a replacement amount of the at least one item, a serving instruction for one of the user and the at least one item, and a billing instruction for the user. The information may also comprise user information.

At step 406, a notification for a merchant associated with at least one of the table and the merchant device is determined, using the serving and sales module, wherein the notification is associated with the item at the table. Where the aspect is related to the connection between the communication device and the second communication module of the table device, the aspect may comprise that the user located at the table, the first information may comprise a number of users located at the table, and the first notification may comprise an alert to the merchant or a merchant employee to serve or assist the user located at the table. In other embodiments, the first aspect may comprise at least one of a name, a quantity, and a number of the at least one item ordered at the table, the first information may comprise a total cost for purchase of the at least one of the name, the quantity, and the number of the at least one item ordered at the table, and the first notification may comprise a bill determined using the total cost. Where the information comprises user information, the first notification may alert the merchant or a merchant employee of the user information for the user. However, where the information comprises item information (e.g., refill/replace/serving information), the notification may alert the merchant or a merchant employee of the item information.

In various embodiments, the serving and sales module may determine a portion of the bill attributable to each of the users at the table. For example, the table device may further detect an amount of each of the at least one item ordered or consumed by each of the users and communicates the amount to the serving and sales module. Thus, the serving and sales module may determine the portion using the amount. Moreover, in certain embodiments, the serving and sales module may update historical sales and/or serving statistics for the merchant with the information for the at least one item and/or user at the table.

Figure 5:
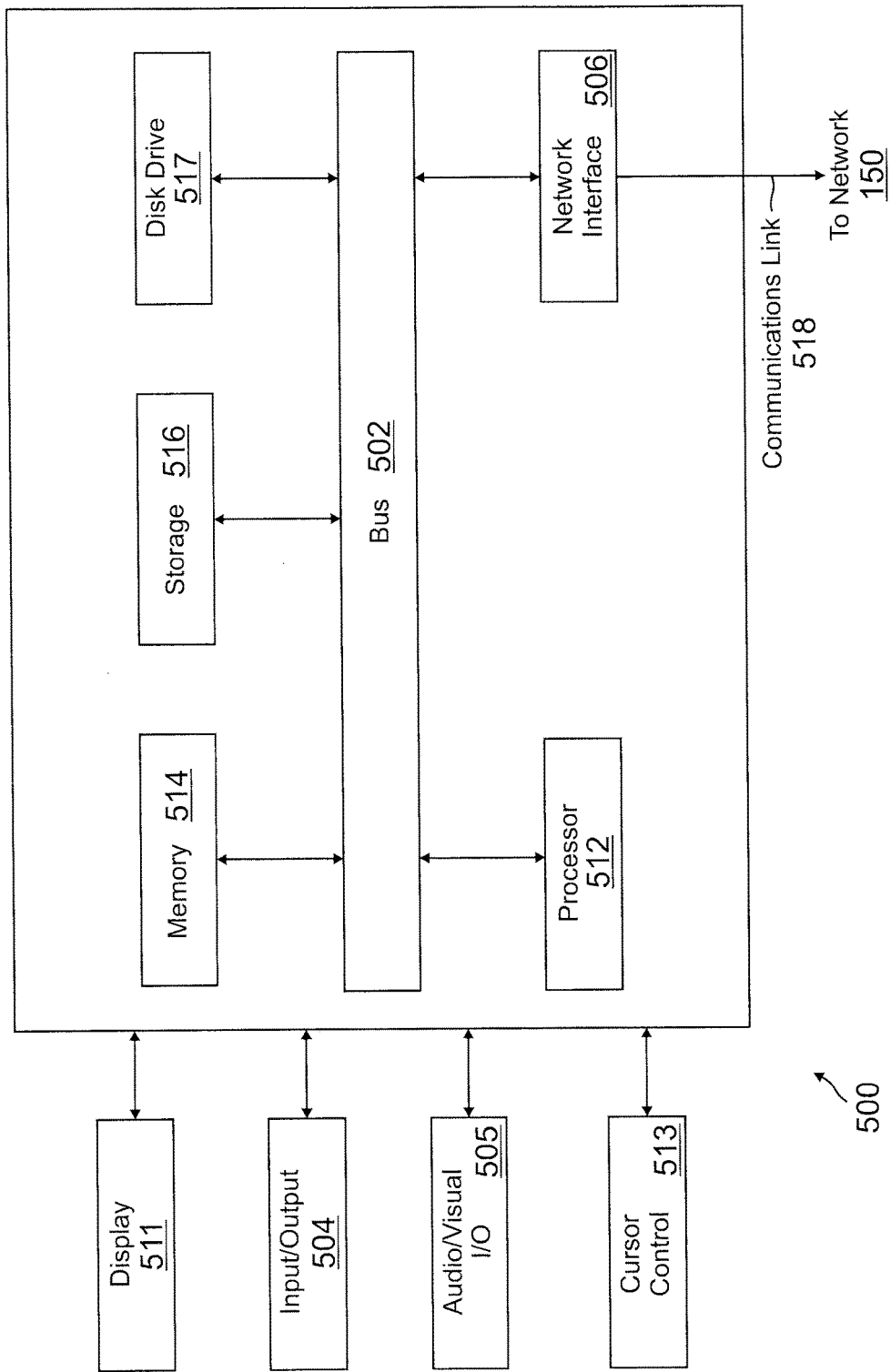
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   at least one processing unit; and
   a memory coupled to the at least one processing unit and storing instructions that, when executed by the at least one processing unit, causes the system to perform operations comprising:
   determining, by one or more sensors associated with a table, a location of each individual from a plurality of individuals at the table;
   determining, by the one or more sensors, a location of a first item on the table;
   automatically associating the first item with a first individual from the plurality of individuals based on proximity of the location of the first item on the table to the location of the first individual at the table;
   determining, by the one or more sensors, that the first individual has consumed at least a portion of the first item; and
   automatically generating at least one bill, wherein the at least one bill is automatically divided among the plurality of individuals with a first portion of the at least one bill including an amount for the first item and being allocated to the first individual based, at least in part, on the one or more sensors determining that at least a portion of the first item has been consumed by the first individual.

2. The system of claim 1, further comprising instructions for automatically detecting, by the one or more sensors, whether the first item has been consumed by the first individual.

3. The system of claim 2, further comprising:
subsequent to detecting that the first item has been consumed, automatically generating a consumption message, the consumption message comprising an identification of the table and information that the first item has been consumed; and
communicating, using a serving and sales module, the consumption message to an electronic device associated with a sever.

4. The system of claim 1, further comprising instructions for receiving payment for the first portion of the at least one bill from the first individual.

5. The system of claim 1, further comprising instructions for determining, using the one or more sensors, a condition of at least one of the plurality of individuals.

6. The system of claim 1, the operations further comprising:
receiving signals from the one or more sensors associated with the table; and
automatically determining, from the signals, an amount of the first item consumed by a second individual from the plurality of individuals at the table.

7. The system of claim 6, the operations further comprising:
automatically generating at least a second portion of the at least one bill being allocated to the second individual, the second portion determined by:
associating the first item with the second individual based on the one or more sensors determining a proximity of the first item to a location associated with the second individual;
determining an initial weight of the first item at the location associated with the second person;
determining a final weight of the first item at the location associated with the second person; and
determining an amount of the first item consumed by the second person, wherein the amount of the first item consumed by the second person is based on a difference between the initial weight of the first item and the final weight of the first item.

8. The system of claim 1, wherein the system further comprises a table device, the table device comprising the one or more sensors configured to determine the location of each individual from the plurality of individuals at the table, a location of each item from a plurality of items on the table, and an amount of each item consumed at a location associated with each individual of the plurality of individuals at the table.

9. A method, comprising:
determining, by one or more sensors associated with a table, a location of each individual from a plurality of individuals at the table;
determining, by the one or more sensors, a location of a first item on the table;
automatically associating the first item with a first individual from the plurality of individuals based on proximity of the location of the first item on the table to the location of the first individual at the table;
determining, based at least in part on proximity of the location of the item to the location of a first individual from the plurality of individuals, that the first individual consumed at least a portion of the first item; and
automatically generating a bill for each individual from the plurality of individuals, wherein a first bill for the first individual includes an amount for the first item based on the one or more sensors determining the first individual consumed at least a portion of the first item.

10. The method of claim 9, further comprising displaying the first bill on a display of computing device.

11. The method of claim 9, further comprising determining, using the one or more sensors, one or more aspects for at least one individual at the table.

12. The method of claim 11, further comprising providing a notification to a server of the table of the one or more aspects for the at least one individual at the table.

13. The method of claim 9, further comprising receiving payment from at least one individual.

14. The method of claim 9, further comprising determining, using the one or more sensors, additional information about the item on the table.

15. A method, comprising:
determining, by one or more sensors, a first location of a first individual among a plurality of individuals at a table;
receiving, by the one or more sensors, a first measurement of a first item located at a second location on a surface of the table;
receiving, by the one or more sensors, a second measurement of the first item located at the second location on the surface of the table, wherein the second measurement is different than the first measurement;
determining, based on proximity of the first location to the second location, that the first individual of the plurality of individuals caused the second measurement to be different than the first measurement; and
automatically generating a bill for the first individual, with a first portion of the bill including an amount for the first item, and allocated to the first individual based, at least in part, on the one or more sensors determining that the first individual caused the difference between the first measurement and the second measurement.

16. The method of claim 15, wherein the first measurement and the second measurement are weight measurements.

17. The method of claim 15, further comprising determining, using the one or more sensors, one or more aspects of each of the plurality of individuals.

18. The method of claim 17, further comprising notifying a server associated with the table of the one or more aspects of each of the plurality of individuals.

19. The method of claim 15, further comprising notifying a server associated with the table of the second measurement.

20. The method of claim 15, further comprising receiving payment information from the first individual for the first bill.

* * * * *